United States Patent
Mesnet et al.

[15] 3,659,813

[45] May 2, 1972

[54] APPARATUS FOR DOCKING A HELICOPTER

[72] Inventors: Jean Dominique Francois Gerard Mesnet, London, England; Raymond Louis Le Guennec, Lorient; Georges Edouard Louis Leon Dadon, Kremlin Bicetre, both of France

[73] Assignee: Etat Francais, Paris, France

[22] Filed: Apr. 28, 1970

[21] Appl. No.: 32,656

[30] Foreign Application Priority Data

Apr. 28, 1969 France...................6913376

[52] U.S. Cl. .........................................244/116
[51] Int. Cl. .............................................B64f 1/12
[58] Field of Search..............346/29; 244/114, 115, 116, 244/110 E

[56] References Cited

UNITED STATES PATENTS

| | | | |
|---|---|---|---|
| 3,145,070 | 8/1964 | Miller et al. | 346/29 |
| 2,620,256 | 12/1952 | Kerns et al. | 346/29 X |
| 3,258,776 | 6/1966 | Boyle et al. | 346/29 |
| 3,291,422 | 12/1966 | Van Valkenburg | 244/114 |
| 3,303,807 | 2/1967 | Stewart et al. | 244/115 X |
| 3,473,009 | 10/1969 | Gerber et al. | 346/29 X |

*Primary Examiner*—Milton Buchler
*Assistant Examiner*—Paul E. Sauberer
*Attorney*—Waters, Roditi, Schwartz & Nissen

[57] ABSTRACT

A helicopter is attached, at its center of rotation on its wheels, to a turnable coupling of a trolley. The trolley is displaceable along a worm gear mounted in a cross strut and the cross strut is driven in a linear path by a drive mechanism located beneath the surface on which the helicopter rests. The trolley is displaceable on the worm gear along a line which is angularly offset from the linear path of travel of the cross strut and preferably perpendicularly thereto. The helicopter may then be moved along any path of travel by selective combination of the rates of drive of the cross strut and the trolley thereon.

10 Claims, 2 Drawing Figures

APPARATUS FOR DOCKING A HELICOPTER

BRIEF SUMMARY OF THE INVENTION

The present invention relates to docking apparatus for removal of loads or appliances on a plane surface along paths determined by the combination of a fixed or variable speed ratio of two fundamental linear movements at an angle to each other and situated in said plane; the positioning of the load or appliance in relation to the path to be followed can be combined with such movement.

An object of the present invention is to provide a docking apparatus ensuring removal of a wheeled object on a flat surface from some point located within a predefined contour to one of two predetermined berths, the removal being effected in such a way that the object to be moved is subjected only to the movements of normal rolling of the wheels (without skidding). The invention is especially but not exclusively applicable to the docking of a helicopter aboard a ship in bad weather without breaking the ship-to-helicopter connection.

According to the invention there is provided apparatus for docking a turnable and displaceable body, said apparatus comprising a deck upon which the body rests, first means engaging the body for displacing the same on said deck, second means above the deck engaged with the first means to drive the same in a first linear direction, and third means below the deck and engaging the first means to propel the same in a second linear direction independently of its drive in said first linear direction, said second direction being angularly offset from the first direction whereby the body can be displaced in any direction by selective combination of rates of drive in said first and second directions.

DETAILED DESCRIPTION

Figure 1:
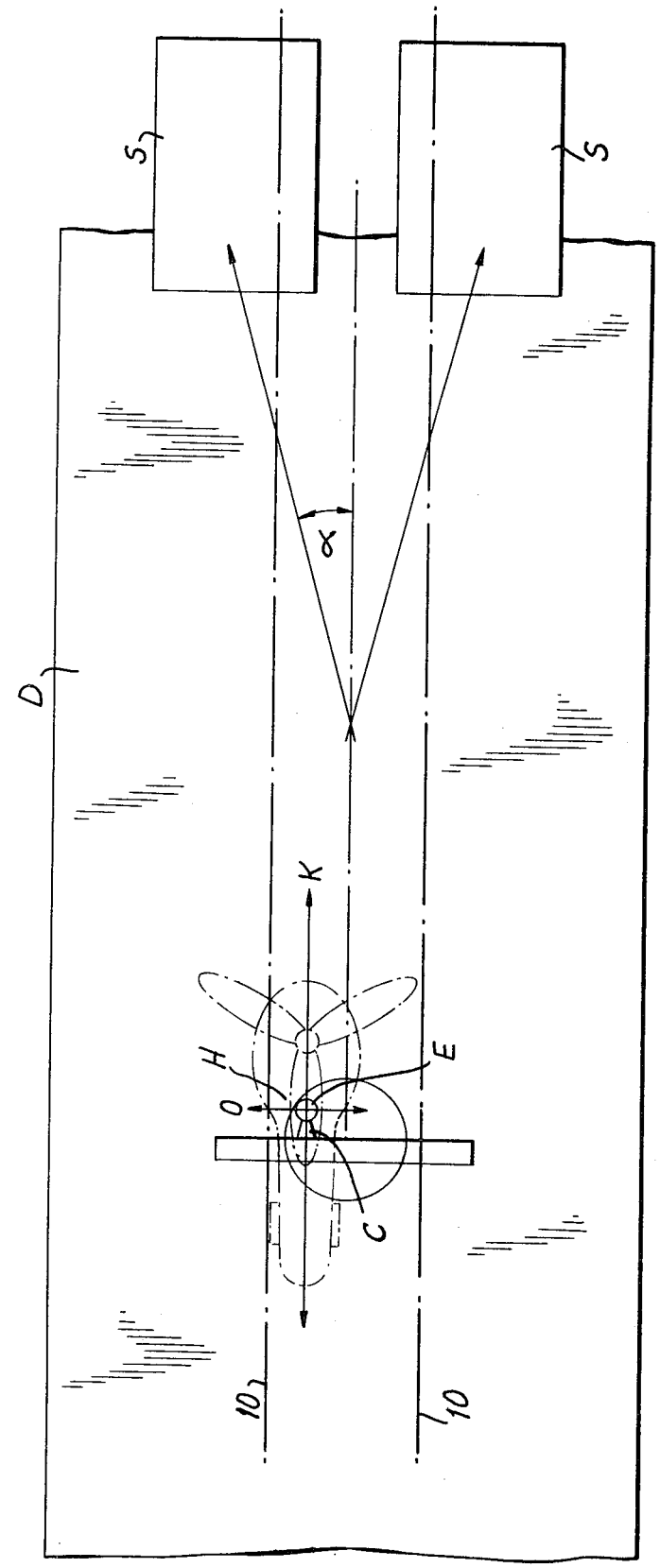
FIG. 1 is a diagrammatic plan view showing the support of a helicopter on a deck of a ship.

Referring to the drawing, FIG. 1 shows a body H which may be a helicopter or other wheeled vehicle which rests on a planar surface or deck D. The helicopter H is connected by a coupling E to a drive mechanism, to be described later, such that the helicopter can be moved from an exposed position as shown in FIG. 1 to one of two or more berths or hangars S along respective paths as shown by the arrows. The transfer is to be made without breaking the connection between the coupling E and the helicopter as the transfer is intended to be made during bad weather and possibly on board a ship. Thus the helicopter is securely held at all times. The helicopter has a center of rotation on its own wheels and the coupling is attached to the helicopter at this center of rotation so that all movement of the helicopter can be made by turning and without sliding.

In the disclosed embodiment, the path of movement of a helicopter is precisely defined as being constituted by a series of straight lines preceded or succeeded by rotations at the junctures of the lines to guide the helicopter parallel to the straight path it is about to follow. Such rotation is about the center of rotation of the helicopter which is an axis located at the intersection between a plane perpendicular to the deck and passing through the common axis of the wheels of the main landing gear and a plane perpendicular to the deck and constituting the longitudinal plane of symmetry of the helicopter.

The drive mechanism or docking gear consists mainly of two docking trolleys $T_1$, $T_2$ with engines M below deck, a cross strut A joined to these trolleys above the deck and propelled by a longitudinal, so-called primary movement in a direction K, and a rudder-bar carrier trolley C driven in a transverse so-called secondary movement O on the cross strut A.

A straight displacement of the docking rudder bar of coupling E to which the helicopter is attached is obtained by combining the primary cross strut motion K with the secondary motion of the rudder-bar carrier trolley C.

A displacement at an angle $\alpha$ in relation to direction K (generally the centerline of the site or ship) is obtained by selection of the speed ratio at which the combination of the two displacement motions along K and O is made. The drive apparatus for the primary and secondary movements are firmly engaged with the vessel without chance of side slip, by means of a rack 3 and pinion 2.

Turning of the helicopter is obtained through bearing of the rudder bar about a vertical axis coincident with the intersection of the vertical plane of longitudinal symmetry of the helicopter with the vertical plane passing through the axes of the main landing wheels. The rudder bar, and therefore the helicopter, bears always at an angle equal to that chosen for the berthing path.

The path of the helicopter is therefore the result of an initial turn, a straight path of travel at a particular angle, a second turn, a second straight path of travel at an angle $\alpha$ to the opening of a hangar S, then a turn at the entrance to the hangar so that the helicopter squarely faces the same and can be moved thereinto.

A connection is maintained between the helicopter and the ship by the coupling C itself controlled in the pits beneath the deck D.

Power supply with operational requirements and safety conditions.

The need for power during the maneuvering to bring the docking apparatus alongside the helicopter and to obtain the separate primary and secondary motions, has resulted in the use of the necessary drive means. Two main engines M have been provided (each by itself can effect the transfer at reduced speed) and one auxiliary motor N to operate the rudder-bar trolley C independently by the cross strut movement.

Figure 2:
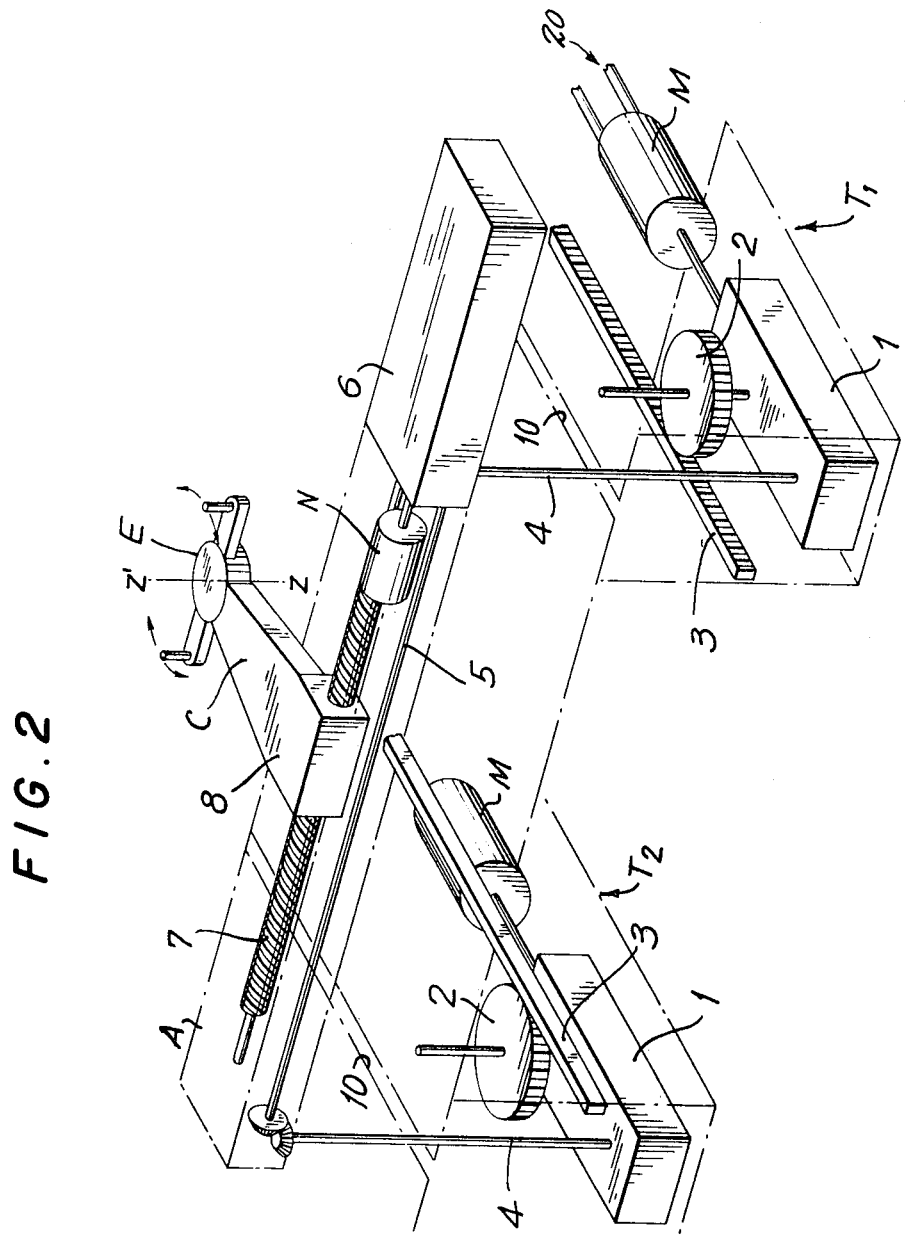
FIG. 2 is a perspective view diagrammatically illustrating the drive mechanism for the docking of the helicopter.

The engines M and N are supplied with compressed air at low pressure through respective pairs of air hoses 20 (one in each pit and only one visible in FIG. 2). The compressed air operates as a working fluid complying with safety requirements in an area where liquid fuel might be subject to assuming a vaporous state. Each hose 20 winds onto a fast reel located in the hanger.

The two racks 3 (one in each pit) are secured to the pit walls by means of flexible bearings (not shown) and are tightly held against the gear wheel 2 with which they engage.

An obstacle-free, unencumbered deck is obtained according to the invention. To allow unencumbered rolling of the helicopter, the docking trolleys $T_1$ and $T_2$ are located in pits beneath the deck. To allow the deck to be completely free of all obstacles, the docking arrangement can be stored below the deck by a hoist.

The movements of the various units forming the docking apparatus can be obtained by means of the three reversible compressed-air engines, of which the two main engines M are securely mounted on each respective docking trolley and the subsidiary engine N is mounted directly on the cross strut A.

The main engines M drive the respective gears 2 through mechanical drives or gear boxes 1. The gears 2 engage respective racks 3 secured with the pit walls to effect shifting of the docking gear trolleys $T_1$ and $T_2$.

The two main engines are mechanically synchronized by means of two shafts 4 and a timing shaft 5 located above the deck. Shafts 4 pass through slots 10 in the deck.

The timing shaft 5 can, in an emergency, (one main engine M inoperative) drive the gears 2 from a single main engine M. In such a case, a gear release located in each gear box 1 allows the engine to be decoupled.

A mechanical drive contained in a gear box 6 is driven by timing shaft 5 and imparts the movement to a worm 7 to produce displacement of trolley C by engagement of the non-rotatable nut 8 with worm 7.

The selected speed ratios of the mechanical drives govern the path of trolley C.

Trolley C can be moved on cross strut A when the movement of trolley C on cross strut A and the movement of cross strut A in direction K are independent of each other. For this purpose a motion reversal arrangement located in gear box 6 allows the timing shaft 5 to be detached from the mechanical units in gear box 6 and to combine these units with subsidiary engine N.

In this case, the main engines M solely govern the shifting of the cross strut A of the docking gear assembly, and the auxiliary motor N independently drives the worm 7 and therefore independently effects the shifting of trolley C.

The rudder bar or coupling E can be rotated around axis ZZ' of the trolley C by means of a mechanical or hand-driven worm gear unit. This permits turning the helicopter in place, for example, in preparation for displacement along a changed line of travel.

What is claimed is:

1. Apparatus for docking a turnable and displaceable body, said apparatus comprising a deck upon which the body rests, first means engaging the body for displacing the same on said deck, second means above the deck engaged with the first means to drive the same in a first linear direction, and third means below the deck and engaging the first means to propel the same in a second linear direction independently of its drive in said first linear direction, said second direction being angularly offset from the first direction whereby the body can be displaced in any direction by selective combination of rates of drive in said first and second directions, said third means comprising a stationary rack extending in said second linear direction, a gear in mesh with said rack, a motor coupled to said gear to drive the same and cause the gear to be displaced in said second linear direction, and means coupling said gear, said second means, and said first means to produce concurrent movement thereof.

2. Apparatus as claimed in claim 1, wherein said first means includes a rotatable coupling with said body to turn the body on the deck.

3. Apparatus as claimed in claim 2 comprising means connecting said third means and said second means and movable with said third means in slots provided in said deck and extending parallel to said second direction.

4. Apparatus as claimed in claim 3, wherein said first and second directions are perpendicular to one another.

5. Apparatus as claimed in claim 2, wherein said coupling has a center of rotation, and said body has a center of rotation coinciding with the center of rotation of the coupling.

6. Apparatus as claimed in claim 1, wherein said motor is driven by compressed air.

7. Apparatus as claimed in claim 1, wherein said third means comprises an additional motor coupled to the first means to propel the same in said second linear direction.

8. Apparatus as claimed in claim 1, wherein said third means further comprises a second rack, gear and motor coupled to the first means to propel the same, and further comprising means synchronizing the drive of said two displaceable motors.

9. Apparatus as claimed in claim 1, wherein said second and third means are coupled together for being driven from a common source.

10. Apparatus as claimed in claim 1, wherein said motor is connected to said gear for common displacement therewith in said second linear direction.

* * * * *